United States Patent
Luo (10) Patent No.: US 9,933,858 B2
(45) Date of Patent: Apr. 3, 2018

(54) KEYBOARD OPERATED WITH TWO THUMBS AND KEY LAYOUT METHOD THEREOF

(71) Applicant: SHENZHEN HSMC TECHNOLOGY CO., LTD., Shenzhen, Guangdong OT (CN)

(72) Inventor: Mengming Luo, Jiangxi (CN)

(73) Assignee: SHENZHEN HSMC TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 15/362,842

(22) Filed: Nov. 29, 2016

(65) Prior Publication Data

US 2017/0123507 A1     May 4, 2017

Related U.S. Application Data

(63) Continuation-in-part of application No. 14/857,841, filed on Sep. 18, 2015, which is a continuation of
(Continued)

(30) Foreign Application Priority Data

Sep. 29, 2013  (CN) .......................... 2013 1 0466838
Nov. 14, 2013  (CN) .......................... 2013 1 0565660

(51) Int. Cl.
G06F 3/02     (2006.01)
G06F 3/0488   (2013.01)
G06F 3/0489   (2013.01)

(52) U.S. Cl.
CPC ........ *G06F 3/0216* (2013.01); *G06F 3/04886* (2013.01); *G06F 3/04897* (2013.01)

(58) Field of Classification Search
CPC . G06F 3/0216; G06F 3/04886; G06F 3/04897
See application file for complete search history.

(56) References Cited

U.S. PATENT DOCUMENTS

2008/0205960 A1* 8/2008 Siddeeq ............... G06F 3/0219
                                                                400/489
2008/0297377 A1* 12/2008 Wang .................... G06F 1/1626
                                                                341/22
(Continued)

FOREIGN PATENT DOCUMENTS

CN       102810039 A     12/2012
CN       102834789 A     12/2012
(Continued)

OTHER PUBLICATIONS

European Search Report of counterpart European Patent Application No. 14846927.3 dated Mar. 1, 2017.

*Primary Examiner* — Sahlu Okebato (57) ABSTRACT

The present invention discloses a keyboard and a key layout method. When an operator holds the keyboard with both hands, thumbs of a left and right hands cannot touch a middle position of the keyboard, the keyboard has at least three rows of keys and more than five keys arranged in each row, and widths of all the keys arranged on a middle line of the keyboard are all greater than a width exceeding a touchable range of the thumbs of both hands in a keyboard width; widths of a left side key and a right side key arranged closest to the middle line of the keyboard are greater than a half of the width exceeding the touchable range of the thumbs of both hands in the keyboard width. All the keys in the keyboard are respectively located at positions touched by the left and right thumbs.

13 Claims, 3 Drawing Sheets

Related U.S. Application Data application No. PCT/CN2014/085912, filed on Sep. 4, 2014.

(56) References Cited

U.S. PATENT DOCUMENTS

| | | |
|---|---|---|
| 2010/0156808 A1 | 6/2010 | Stallings et al. |
| 2011/0099505 A1 | 4/2011 | Dahl |
| 2011/0254865 A1 | 10/2011 | Yee et al. |
| 2012/0075194 A1 | 3/2012 | Ferren |
| 2012/0113007 A1 | 5/2012 | Koch et al. |
| 2012/0206363 A1 | 8/2012 | Kyprianou et al. |
| 2012/0240069 A1 | 9/2012 | Kawalkar |
| 2013/0174079 A1 | 7/2013 | Morley et al. |
| 2013/0222247 A1 | 8/2013 | Liu et al. |
| 2014/0152575 A1 | 6/2014 | Joe et al. |

FOREIGN PATENT DOCUMENTS

| | | |
|---|---|---|
| CN | 103576879 A | 2/2014 |
| WO | 2013024526 A1 | 2/2013 |

\* cited by examiner

KEYBOARD OPERATED WITH TWO THUMBS AND KEY LAYOUT METHOD THEREOF

CROSS REFERENCE TO RELATED APPLICATIONS

The present application is a Continuation-in-Part Application of U.S. patent application Ser. No. 14/857,841 filed on Sep. 18, 2015, which is a Continuation application of PCT application No. PCT/CN2014/085912 filed on Sep. 4, 2014, which claims the benefits of Chinese Patent Application No. 201310466838.5 filed on Sep. 29, 2013 and Chinese Patent Application No. 201310565660.X filed on Nov. 14, 2013; the contents of which are hereby incorporated by reference.

TECHNICAL FIELD

The present invention relates to a keyboard and a key layout method thereof, and particularly relates to a keyboard operated with two thumbs and a key layout method thereof.

BACKGROUND

Generally speaking, a virtual keyboard is as wide as a touch screen. If the touch screen/virtual keyboard is too wide and a large number of keys are arranged on the same row, an operator cannot touch or control the keys with both thumbs (the left/right thumb cannot touch or control the keys at the middle of the virtual keyboard). In view of the problem that the touch screen/virtual keyboard is too wide and the operator cannot control the keys for inputting with both thumbs, the existing technical solution is to split the virtual keyboard and the keys thereon into two independent keyboards (i.e. half of keyboard on the left and half of the keyboard on the right) and display the two keyboards on the left and right sides of the touch screen. Although this can satisfy the requirement of the operator of controlling the keys with both thumbs, negative issues caused by splitting the keyboard apparently exist. For example, two keyboards are required for input, and the man-machine interface is poor. Also, the change of the original key layout and the relative positions of the keys would affect the operability of the keyboard. As for a physical keyboard, the prior arts is the same to the virtual keyboard, and if a width of the physical keyboard is large, the physical keyboard is separated into two separate physical keyboards or the keys in the physical keyboard are split into left and right key areas, which can also cause many negative issues such as poor operability.

SUMMARY

The purpose of the present invention is to overcome the defects of the prior art and provide a keyboard operated with two thumbs and a key layout method thereof, and all the keys in the keyboard are located touchable positions of left and right thumbs of an operator when the keyboard is held on two hands regardless of a width of the keyboard.

The technical problem in the present invention is solved by the following technical solutions.

A keyboard having a dimension such that when an operator holds a left side and a right side of the keyboard with a left hand and a right hand respectively is provided, a middle region of the keyboard is untouchable by a left thumb and a right thumb of the operator, the keyboard includes at least three rows of keys, each row having more than five keys, wherein each row of keys comprises one or two keys selected from the group consisting of a middle key lying on a middle line perpendicular to the rows of keys and having a width greater than a width of the middle region disposed beyond touchable ranges of the left and right thumbs of the operator; and left and right middle keys lying on a left side and a right side of the middle line and adjacent to each other, each of the left middle key and the right middle key having a width greater than a half of the width of the middle region; wherein all the keys in the keyboard are respectively located at positions touchable by the left and right thumbs of the operator.

Preferably, a distance from a left sidewall of the middle key to the middle line is equal to a distance from a right sidewall of the middle key to the middle line; and a distance from a left sidewall of the left middle key to the middle line is equal to a distance from a right sidewall of the right middle key to the middle line.

Preferably, preset widths of the keys in the keyboard are set according to a keyboard width and percentages that widths of the keys account for in the keyboard width, a remaining width acquired by subtracting the width of the middle region from the keyboard width is used as the keyboard width when setting the widths of the keys, wherein the width of the middle key has the width of the middle region added therein, and the width of each of the left middle key and the right middle key has a half of the width of the middle region added therein.

Preferably, the keyboard further comprises blank areas, and the preset widths of the keys and preset widths of the blank areas are set according to the keyboard width and the percentages that the widths of the keys and the widths of the blank areas account for in the keyboard width.

Preferably, when the operator holds the keyboard with both hands, the left and right thumbs of the operator at least respectively touch a leftmost end and a rightmost end of the middle key, and the left and right thumbs of the operator at least respectively touch a leftmost end of the left middle key and a rightmost end of the right middle key.

Preferably, the keyboard is a physical keyboard, and the middle region of the physical keyboard is untouchable by the left and right thumbs of the operator holding the left and right sides of the keyboard with the left and right hands respectively.

Preferably, the keyboard is a virtual keyboard, and the virtual keyboard is displayed on a wide touch screen having a middle region untouchable by the left and right thumbs of the operator holding the left and right sides of the keyboard with the left and right hands respectively.

Preferably, the operator modifies a specific parameter to locate all the keys in a current virtual keyboard at touchable positions of the thumbs of the left and right hands respectively, and the specific parameter is a parameter value used for determining the width of the middle region.

Preferably, the physical keyboard can be physically separated into a left portion and a right portion along the middle line of the physical keyboard. The left and right portions may be physically engaged by known methods such as hinged-connection, snap-connection, etc.

Preferably, a key layout method for a keyboard operable by a left thumb and a right thumb of an operator holding a left side and a right side of the keyboard with a left hand and a right hand respectively, the method including the steps of:

presetting a keyboard, wherein the keyboard is provided with at least three rows of keys, each row having more than five keys; and counteracting a width of a middle region of the keyboard disposed beyond touchable ranges of the left and right thumbs of the operator by a width of a middle key lying on a middle line perpendicular to the rows of keys, and widths of a left middle key and an adjacent right middle key lying on a left side and a right side of the middle line, so that all the keys in the keyboard are respectively located at positions touchable by the left and right thumbs of the operator.

Preferably, a distance from a left sidewall of the middle key to the middle line is equal to a distance from a right sidewall of the middle key to the middle line; and a distance from a left sidewall of the left middle key to the middle line is equal to a distance from a right sidewall of the right middle key to the middle line.

Preferably, preset widths of the keys in the keyboard are set according to a keyboard width and percentages that widths of the keys account for in the keyboard width, a remaining width acquired by subtracting the width of the middle region from the keyboard width is used as the keyboard width when setting the widths of the keys, wherein the width of the middle key has the width of the middle region added therein, and the width of each of the left middle key and the right middle key has a half of the width of the middle region added therein.

Preferably, the keyboard further comprises blank areas, and the preset widths of the keys and preset widths of the blank areas are set according to the keyboard width and the percentages that the widths of the keys and the widths of the blank areas account for in the keyboard width.

Preferably, the keyboard is a physical keyboard, and the middle region of the physical keyboard is untouchable by the left and right thumbs of the operator holding the left and right sides of the keyboard with the left and right hands respectively.

Preferably, the keyboard is a virtual keyboard, and the virtual keyboard is displayed on a wide touch screen having a middle region untouchable by the left and right thumbs of the operator holding the left and right sides of the keyboard with the left and right hands respectively.

Preferably, the operator modifies a specific parameter to locate all the keys in a current virtual keyboard at touchable positions of the thumbs of the left and right hands respectively, and the specific parameter is a parameter value used for determining the width of the middle region.

Preferably, key layout of the virtual keyboard includes:
displaying a preset virtual keyboard on the touch screen according to a conventional key layout and corresponding settings of the preset virtual keyboard;
determining a width of the preset virtual keyboard on a current screen according to a width of the current screen; and
calculating preset widths of the keys in the current virtual keyboard and preset width of blank areas according to the current virtual keyboard width and percentages that the preset widths of the keys and the preset width of the blank areas account for in the virtual keyboard width.

Compared with the prior art, the present invention has the advantages and effects that, for the virtual keyboard, on the premise of not changing the key layout, the key position setting of the preset virtual keyboard, and the width of the current virtual keyboard determined according to the current screen width, when the preset virtual keyboard is displayed and runs on the wide touch screen, the keys therein can be respectively located at touchable positions of left and right thumbs of the operator. No matter how wide the current touch screen is, the operator can modify the specific parameter by touching the corresponding key to touch all keys in the virtual keyboard by both thumbs. As for the physical keyboard, all the keys in the physical keyboard can be touched by left and right thumbs of the operator when the physical keyboard is held on two hands regardless of the width of the physical keyboard. The virtual keyboard can be widely applied to wide touch screens of mobile phones and tablet computers, and the physical keyboard can be widely applied to mobile phones, tablet computers, Bluetooth keyboard, hand-held keyboard, and so on.

DETAILED DESCRIPTION OF THE EMBODIMENTS

A further illustration of the present invention will be given below in combination with specific embodiments.

Embodiment 1

Figure 1:
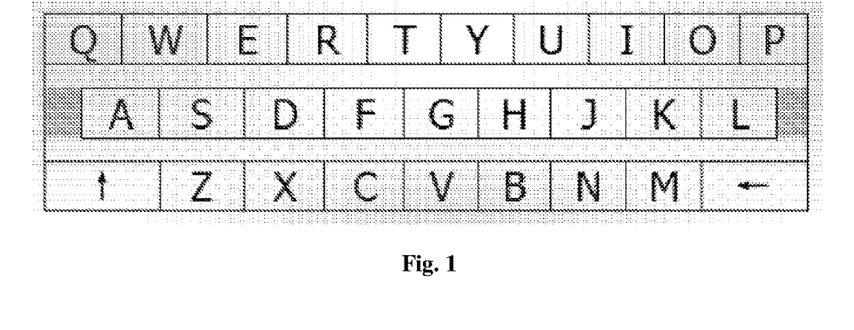
FIG. 1 is a diagram of a keyboard according to specific embodiment 1 when "specific parameter" is "0". Namely, a width of the keyboard does not go beyond a width of a touchable range of the thumbs of both hands, and the keyboard can be a virtual keyboard displayed on a touch screen or a physical keyboard.

The specific embodiment is based on a preset virtual keyboard or a physical keyboard as shown in FIG. 1, which is provided with 26 letter keys and 2 function keys, wherein the percentage of a preset width of each letter key in the virtual keyboard width is set at 10%, the percentage of the a preset width of each function key in the virtual keyboard width is set at 15%, and the percentage of a preset width of a blank area on the left side of the letter A key and the percentage of a preset width of a blank area on the right side of the letter L key in the virtual keyboard width are set at 5%.

The letter T key and the letter Y key on the first row of the keys are keys arranged on the left and right sides of the center line of the virtual keyboard, and the distance from the left end sideline of the letter T key to the center line of the virtual keyboard is basically equal to the distance from the right end sideline of the letter Y key to the center line of the virtual keyboard.

The letter G key on the second row of the keys is a key arranged on the center line of the virtual keyboard, and the distance from the left end sideline of the letter G key to the center line of the virtual keyboard is basically equal to the distance from the right end sideline thereof to the center line of the virtual keyboard.

The letter V key on the third row of the keys is a key arranged on the center line of the virtual keyboard, and the distance from the left end sideline of the letter V key to the center line of the virtual keyboard is basically equal to the distance from the right end sideline thereof to the center line of the virtual keyboard.

As for the virtual keyboard, in the specific embodiment, the virtual keyboard width at least necessary for displaying the keys is set at "400" points. The keys arranged on the center line of the current virtual keyboard are set to increase their key widths according to a width value marked by a specific parameter based on the preset widths thereof, and the keys arranged on the left and right sides of the center line of the current virtual keyboard are set to increase their key widths according to half of the width value marked by the specific parameter based on the preset widths thereof.

For example, the current screen width/virtual keyboard width is "720" points, the initial value/minimum value of the specific parameter is "0", and the width value marked by the specific parameter is "0" point, namely a current virtual keyboard width does not exceed a width of a touchable range of the thumbs of both hands.

Firstly, the width value "0" marked by the specific parameter is subtracted from the adopted width value "720" of the current virtual keyboard to acquire a residual width value "720", and the residual width value is used as a new keyboard width.

The computer program calculates the new preset widths of each key and each blank area in the current virtual keyboard according to the new keyboard width, namely "720" points, and the percentages of the preset widths of each key and each blank area in the virtual keyboard width.

Then, the letter G key and the letter V key arranged on the center line of the current virtual keyboard are added with the width value of "0" point (the width value marked by the specific parameter) based on the preset widths thereof; and the letter T key and the letter Y key arranged on the left and right sides of the center line of the virtual keyboard are respectively added with half of the width value of "0" point (the width value marked by the specific parameter) based on the preset widths thereof.

The result is that in the width of the current virtual keyboard, the new preset width of each letter key is "72" points, the new preset width of each function key is "108" points, and the new preset width of the blank area on the left side of the letter A key and the new preset width of the blank area on the right side of the letter L key are "36" points.

Based on the new preset widths of the keys, after the width value of "0" point is respectively added to the letter G key and the letter V key arranged on the center line of the current virtual keyboard, the widths thereof are still "72" points; and after the width value of "0" point is respectively added to the letter T key and the letter Y key arranged on the left and right sides of the center line of the virtual keyboard, the widths thereof are still "72" points.

As described above, the current virtual keyboard displayed on the touch screen is as shown in FIG. 1. Apparently, the operator cannot touch or control the keys arranged at the middle of the virtual keyboard when using both thumbs to touch the keys. The operator modifies the specific parameter by touching a corresponding key to respectively locate the keys in the current virtual keyboard at touchable positions of left and right thumbs.

Figure 2:
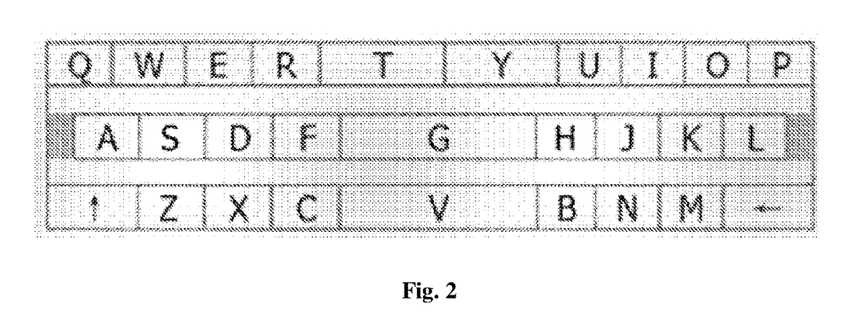
FIG. 2 is a diagram of a keyboard according to the specific embodiment 1 when "specific parameter" is "200". Namely, a width of the keyboard is more than a width of a touchable range of the thumbs of both hands by "200" points, and the keyboard can be a virtual keyboard displayed on a touch screen or a physical keyboard.

For example, the current screen width/virtual keyboard width is "720" points. The operator modifies the specific parameter to "200" points, and then the width value marked by the specific parameter is "200" points.

Firstly, the width value "200" marked by the specific parameter is subtracted from the adopted width value "720" of the current virtual keyboard to acquire a residual width value "520", and the residual width value is used as a new keyboard width.

The computer program calculates the new preset widths of each key and each blank area in the current virtual keyboard according to the new keyboard width, namely "520" points, and the percentages of the preset widths of each key and each blank area in the virtual keyboard width.

Then, the letter G key and the letter V key arranged on the center line of the current virtual keyboard are added with the width value of "200" point (the width value marked by the specific parameter) based on the preset widths thereof; and the letter T key and the letter Y key arranged on the left and right sides of the center line of the virtual keyboard are respectively added with half of the width value of "200" point (the width value marked by the specific parameter) based on the preset widths thereof.

The result is that in the width of the current virtual keyboard, the new preset width of each of the 26 letter keys is "52" points, the new preset width of each function key is "78" points, and the new preset width of the blank area on the left side of the letter A key and the new present width of the blank area on the right side of the letter L key are "26" points.

Based on the new preset widths of the keys, after the width of "200" points is respectively added to the letter G key and the letter V key arranged on the center line of the current virtual keyboard, the widths thereof are changed to "252" points; and after the width of "100" points is respectively added to the letter T key and the letter Y key arranged on the left and right sides of the center line of the virtual keyboard, the widths thereof are respectively changed to "152" points.

As described above, the current virtual keyboard displayed on the touch screen is as shown in FIG. 2. Apparently, the operator can control the keys arranged at the middle of the virtual keyboard when using both thumbs to touch the keys.

As for the physical keyboard, in the specific embodiment, the keys arranged on the center line of the current physical keyboard are set to increase their key widths according to a width value marked by a specific parameter based on the preset widths thereof, and the keys arranged on the left and right sides of the center line of the current physical keyboard are set to increase their key widths according to half of the width value marked by the specific parameter based on the preset widths thereof. The width value marked by a specific parameter is a value of a width exceeding a touchable range of the thumbs of both hands in the current physical keyboard width.

For example, the current physical keyboard width is "720" points, the initial value/minimum value of the specific parameter is "0", and the width value marked by the specific parameter is "0" point.

Firstly, the width value "0" marked by the specific parameter is subtracted from the adopted width value "720" of the current physical keyboard to acquire a residual width value "720", and the residual width value is used as a new keyboard width.

The physical keyboard maker calculates the new preset widths of each key and each blank area in the current physical keyboard according to the new keyboard width, namely "720" points, and the percentages of the preset widths of each key and each blank area in the physical keyboard width.

Then, the letter G key and the letter V key arranged on the center line of the current physical keyboard are added with the width value of "0" point (the width value marked by the specific parameter) based on the preset widths thereof; and the letter T key and the letter Y key arranged on the left and right sides of the center line of the physical keyboard are respectively added with half of the width value of "0" point (the width value marked by the specific parameter) based on the preset widths thereof.

The result is that in the width of the current physical keyboard, the new preset width of each letter key is "72" points, the new preset width of each function key is "108" points, and the new preset width of the blank area on the left side of the letter A key and the new preset width of the blank area on the right side of the letter L key are "36" points.

Based on the new preset widths of the keys, after the width value of "0" point is respectively added to the letter G key and the letter V key arranged on the center line of the current physical keyboard, the widths thereof are still "72" points; and after the width value of "0" point is respectively added to the letter T key and the letter Y key arranged on the left and right sides of the center line of the physical keyboard, the widths thereof are still "72" points.

As described above, the current physical keyboard is as shown in FIG. 1. Apparently, the operator cannot touch or control the keys arranged at the middle of the physical keyboard when using both thumbs to touch the keys.

For example, the current physical keyboard width is "720" points. The operator sets the specific parameter as "200" points, and then the width value marked by the specific parameter is "200" points.

Firstly, the width value "200" marked by the specific parameter is subtracted from the adopted width value "720" of the current physical keyboard to acquire a residual width value "520", and the residual width value is used as a new keyboard width.

The physical keyboard maker calculates the new preset widths of each key and each blank area in the current physical keyboard according to the new keyboard width, namely "520" points, and the percentages of the preset widths of each key and each blank area in the physical keyboard width.

Then, the letter G key and the letter V key arranged on the center line of the current physical keyboard are added with the width value of "200" point (the width value marked by the specific parameter) based on the preset widths thereof; and the letter T key and the letter Y key arranged on the left and right sides of the center line of the physical keyboard are respectively added with half of the width value of "200" point (the width value marked by the specific parameter) based on the preset widths thereof.

The result is that in the width of the current physical keyboard, the preset width of each of the 26 letter keys is "52" points, the preset width of each function key is "78" points, and the preset width of the blank area on the left side of the letter A key and the present width of the blank area on the right side of the letter L key are "26" points.

Based on the new preset widths of the keys, after the width value of "200" points is respectively added to the letter G key and the letter V key arranged on the center line of the current physical keyboard, the widths thereof are changed to "252" points; and after the width value of "100" points is respectively added to the letter T key and the letter Y key arranged on the left and right sides of the center line of the physical keyboard, the widths thereof are respectively changed to "152" points.

As described above, the current physical keyboard is as shown in FIG. 2. Apparently, the operator can control the keys arranged at the middle of the physical keyboard when using both thumbs to touch the keys.

Embodiment 2

Figure 3:
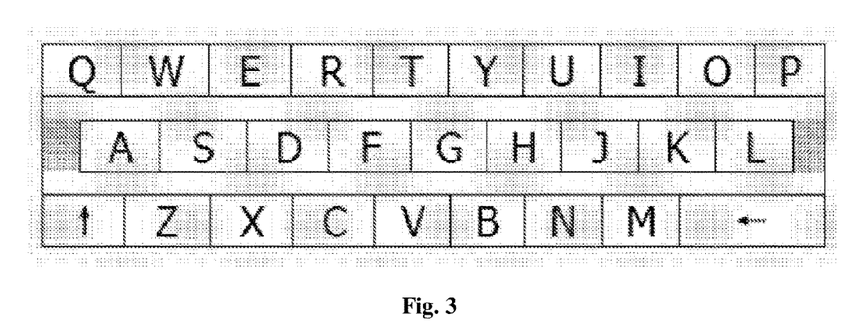
FIG. 3 is a diagram of a keyboard according to specific embodiment 2 when "specific parameter" is "0". Namely, a width of the keyboard does not go beyond a width of a touchable range of the thumbs of both hands, and the keyboard can be a virtual keyboard displayed on a touch screen or a physical keyboard.

The specific embodiment is based on a preset keyboard including a virtual keyboard or physical keyboard as shown in FIG. 3, which is provided with 26 letter keys and 2 function keys, wherein the percentage of a preset width of each letter key in the keyboard width is set at 10%, the percentage of the preset width of the first function key on the left side of the third row in the keyboard width is set at 10%, the percentage of the preset width of the last function key in the third row in the keyboard width is set at 20%, and the percentage of the preset width of a blank area on the left side of the letter A key and the percentage of the preset width of the blank area on the right side of the letter L key in the keyboard width are set at 5%.

The letter T key and the letter Y key on the first row of the keys are keys respectively arranged on the left and right sides of the center line of the virtual keyboard, and the distance from the left end sideline of the letter T key to the center line of the keyboard is basically equal to the distance from the right end sideline of the letter Y key to the center line of the keyboard.

The letter G key on the second row of the keys is a key arranged on the center line of the virtual keyboard, and the distance from the left end sideline of the letter G key to the center line of the keyboard is basically equal to the distance from the right end sideline thereof to the center line of the keyboard.

The letter V key and the letter B key on the third row of the keys are keys arranged on the left and right sides of the center line of the virtual keyboard, and the distance from the left end sideline of the letter V key to the center line of the virtual keyboard is basically equal to the distance from the right end sideline of the letter B key to the center line of the keyboard.

As for a virtual keyboard, in the specific embodiment, the virtual keyboard width at least necessary for displaying the keys is set at "400" points. The keys arranged on the center line of the current virtual keyboard are set to increase their key widths according to a width value marked by a specific parameter based on the preset widths thereof, and the keys which are respectively arranged on the left and right sides of the center line of the current virtual keyboard are set to increase their key widths according to half of the width value marked by the specific parameter based on the preset widths thereof. The width value marked by the specific parameter is a value of a width exceeding a touchable range of the thumbs of both hands in the virtual keyboard width.

For example, the current screen width/virtual keyboard width is "720" points, the initial value/minimum value of the specific parameter is "0", and the width value marked by the specific parameter is "0" point, namely a current virtual keyboard width does not exceed a width of a touchable range of the thumbs of both hands.

Firstly, the width value "0" marked by the specific parameter is subtracted from the adopted width value "720" of the current virtual keyboard to acquire a residual width value "720", and the residual width value is used as a new keyboard width.

The computer program calculates the new preset widths of each key and each blank area in the current virtual keyboard according to the new keyboard width, namely "720" points, and the percentages of the preset widths of each key and each blank area in the virtual keyboard width.

Then, the letter G key arranged on the center line of the current virtual keyboard are added with the width value of "0" point (the width value marked by the specific parameter) based on the new preset widths thereof; and t the letter T, Y keys and the letter V, B keys arranged on the left and right sides of the center line of the virtual keyboard are respectively added with half of the width value of "0" point (the width value marked by the specific parameter) based on the new preset widths thereof.

The result is that in the width of the current virtual keyboard, the preset width of each letter key is "72" points, the preset width of the first function key on the left side of the third row is "72" points, the preset width of the last function key on the right side of the third row is "144" points, and the preset width of the blank area on the left side of the letter A key and the preset width of the blank area on the right side of the letter L key are "36" points.

Based on the new preset widths of the keys, after the width of "0" point is added to the letter G key arranged on the center line of the current virtual keyboard, the width thereof is still "72" points; and after the width of "0" point is respectively added to the letter T, Y keys and letter V, B keys arranged on the left and right sides of the center line of the virtual keyboard, the widths thereof are still "72" points.

As described above, the current virtual keyboard displayed on the touch screen is as shown in FIG. 3. Apparently, the operator cannot control the keys arranged at the middle of the virtual keyboard when using both thumbs to touch the keys. The operator modifies the specific parameter by touching a corresponding key to respectively locate the keys in the current virtual keyboard at touchable positions of left and right thumbs.

Figure 4:
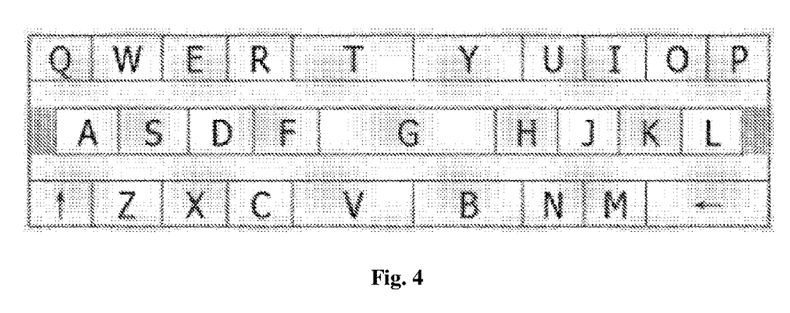
FIG. 4 is a diagram of a keyboard according to the specific embodiment 2 when "specific parameter" is "200". Namely, a width of the keyboard is more than a width of a touchable range of the thumbs of both hands by "200" points, and the keyboard can be a virtual keyboard displayed on a touch screen or a physical keyboard.

For example, the current screen width/virtual keyboard width is "720" points. The operator modifies the specific parameter into "200" points, and then the width value marked by the specific parameter is "200" points.

Firstly, the width value "200" marked by the specific parameter is subtracted from the adopted width value "720" of the current virtual keyboard to acquire a residual width value "520", and the residual width value is used as a new keyboard width.

The computer program calculates the new preset widths of each key and each blank area in the current virtual keyboard according to the new keyboard width, namely "520" points, and the percentages of the preset widths of each key and each blank area in the virtual keyboard width.

Then, the letter G key arranged on the center line of the current virtual keyboard are added with the width value of "200" point (the width value marked by the specific parameter) based on the preset widths thereof; and the letter T, Y keys and the letter V, B keys arranged on the left and right sides of the center line of the virtual keyboard are respectively added with half of the width value of "200" point (the width value marked by the specific parameter) based on the preset widths thereof.

The result is that in the width of the current virtual keyboard, the preset widths of the 26 letter keys are "52" points, the preset width of the first function key on the left side of the third row is "52" points, the preset width of the last function key on the right side of the third row is "104" points, and the preset width of the blank area on the left side of the letter A key and the preset width of the blank area on the right side of the letter L key are "26" points.

Based on the preset widths of the keys, after the width of "200" points is added to the letter G key arranged on the center line of the current virtual keyboard, the width thereof is changed to "252" points. After the width of "100" points is respectively added to the letter T, Y keys and the letter V, B keys arranged on the left and right sides of the center line of the virtual keyboard, the widths thereof are changed to "152" points.

As described above, the current virtual keyboard displayed on the touch screen is as shown in FIG. 4. Apparently, the operator can control the keys arranged at the middle of the virtual keyboard when using both thumbs to touch the keys.

As for the physical keyboard, in the specific embodiment, the keys arranged on the center line of the current physical keyboard are set to increase their key widths according to a width value marked by a specific parameter based on the preset widths thereof, and the keys arranged on the left and right sides of the center line of the current physical keyboard are set to increase their key widths according to half of the width value marked by the specific parameter based on the preset widths thereof. The width value marked by a specific parameter is a value of a width exceeding a touchable range of the thumbs of both hands in the current physical keyboard width.

For example, the current physical keyboard width is "720" points, the initial value/minimum value of the specific parameter is "0", and the width value marked by the specific parameter is "0" point. Namely, a width of the physical keyboard does not go beyond a width of a touchable range of the thumbs of both hands Firstly, the width value "0" marked by the specific parameter is subtracted from the adopted width value "720" of the current physical keyboard to acquire a residual width value "720", and the residual width value is used as a new keyboard width.

The physical keyboard maker calculates the new preset widths of each key and each blank area in the current physical keyboard according to the new keyboard width, namely "720" points, and the percentages of the preset widths of each key and each blank area in the physical keyboard width.

Then, the letter G key arranged on the center line of the current physical keyboard are added with the width value of "0" point (the width value marked by the specific parameter) based on the preset widths thereof; and the letter T, Y keys and the letter V, B keys arranged on the left and right sides of the center line of the physical keyboard are respectively added with half of the width value of "0" point (the width value marked by the specific parameter) based on the preset widths thereof.

The result is that in the width of the current physical keyboard, the preset width of each letter key is "72" points, the preset width of the first function key on the left side of the third row is "72" points, the preset width of the last function key on the right side of the third row is "144" points, and the preset width of the blank area on the left side of the letter A key and the preset width of the blank area on the right side of the letter L key are "36" points.

Based on the preset widths of the keys, after the width value of "0" point (the width value marked by the specific parameter) is added to the letter G key arranged on the center line of the current physical keyboard, the width thereof is still "72" points; and after half of the width value of "0" point ((the width value marked by the specific parameter)) is respectively added to the letter T, Y keys and letter V, B keys arranged on the left and right sides of the center line of the physical keyboard, the widths thereof are still "72" points.

As described above, the current physical keyboard is as shown in FIG. 3. Apparently, the operator cannot control the keys arranged at the middle of the physical keyboard when using both thumbs to touch the keys.

For example, the current physical keyboard width is "720" points. The operator sets the specific parameter as "200" points, and then the width value marked by the specific parameter is "200" points.

Firstly, the width value "200" marked by the specific parameter is subtracted from the adopted width value "720" of the current physical keyboard to acquire a residual width value "520", and the residual width value is used as a new keyboard width.

The physical keyboard maker calculates the new preset widths of each key and each blank area in the current physical keyboard according to the new keyboard width, namely "520" points, and the percentages of the preset widths of each key and each blank area in the physical keyboard width.

Then, the letter G key arranged on the center line of the current physical keyboard are added with the width value of "200" point (the width value marked by the specific parameter) based on the preset widths thereof; and the letter T, Y keys and the letter V, B keys arranged on the left and right sides of the center line of the physical keyboard are respectively added with half of the width value of "200" point (the width value marked by the specific parameter) based on the preset widths thereof.

The result is that in the width of the current physical keyboard, the preset widths of the 26 letter keys are "52" points, the preset width of the first function key on the left side of the third row is "52" points, the preset width of the last function key on the right side of the third row is "104" points, and the preset width of the blank area on the left side of the letter A key and the preset width of the blank area on the right side of the letter L key are "26" points.

Based on the preset widths of the keys, after the width of "200" points is added to the letter G key arranged on the center line of the current physical keyboard, the width thereof is changed to "252" points. After the width of "100" points (half of the width value of "200" point) is respectively added to the letter T, Y keys and the letter V, B keys arranged on the left and right sides of the center line of the physical keyboard, the widths thereof are changed to "152" points.

As described above, the current physical keyboard is as shown in FIG. 4. Apparently, the operator can control the keys arranged at the middle of the physical keyboard when using both thumbs to touch the keys.

Figure 5:
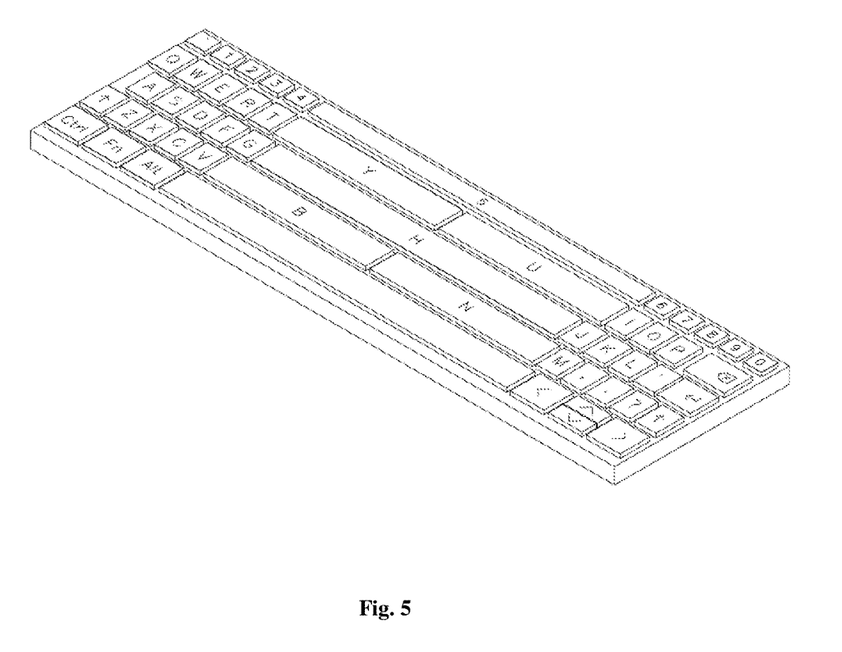
FIG. 5 is a perspective view of a physical keyboard.
Figure 6:
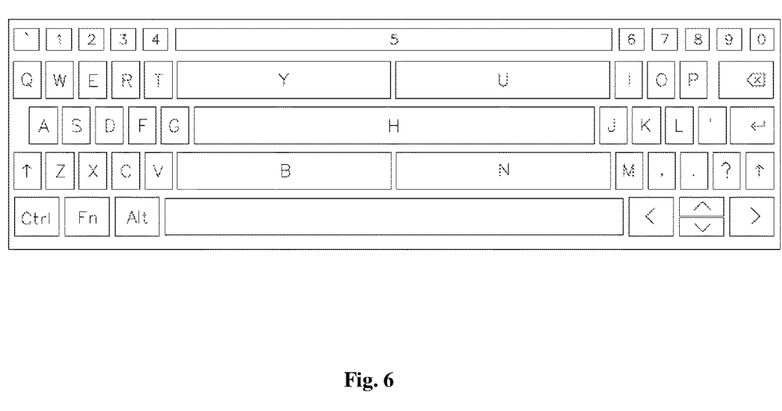
FIG. 6 is a front view of the physical keyboard in FIG. 5.
Figure 7:
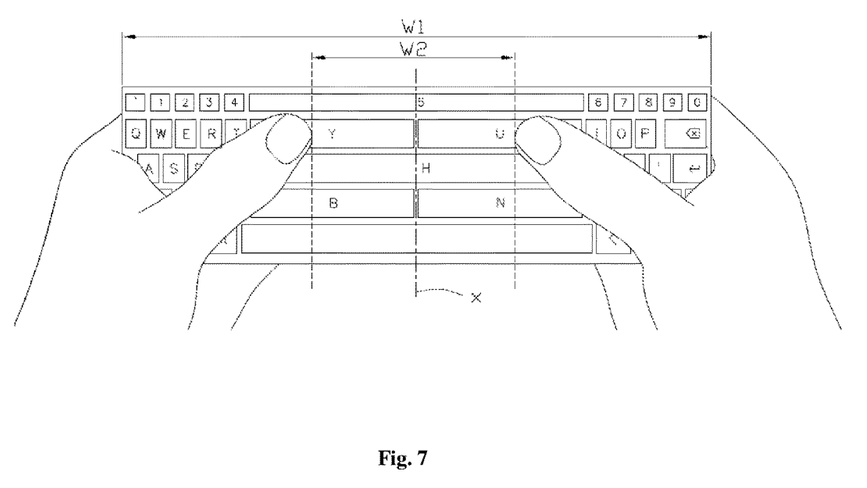
FIG. 7 is a use state view of the physical keyboard.

In addition, as shown in FIG. 5, FIG. 6 and FIG. 7, for a physical keyboard, keys are arranged on the physical keyboard according to a conventional key layout, that is, there are at least three rows of horizontally arranged keys, and more than five keys are arranged in each row. If the physical keyboard is too wide, when the operator holds the physical keyboard with both hands, the thumbs of both hands of the operator cannot touch the middle position of the physical keyboard. In order to solve this technical problem, the following technical solution can also be adopted: when the physical keyboard is manufactured, the width exceeding a touchable range of the thumbs of both hands in the physical keyboard width is counteracted by the width of a middle key arranged on the physical keyboard, and the width exceeding the touchable range of the thumbs of both hands in the physical keyboard width is counteracted by the widths of a left side key and a right side key arranged on the middle line x of the physical keyboard, as shown in FIG. 6. That is to say, when the physical keyboard is manufactured, the keyboard width serving as the reference of the widths of the keys in the physical keyboard is set as W1 as shown in FIG. 7, the width W2 exceeding the touchable range of the thumbs of both hands in the physical keyboard width is subtracted from the physical keyboard width W1 to acquire a residual width numerical value (i.e., W1-W2), the residual width value is used as a new keyboard width, the widths of the keys are recalculated based on the new keyboard width and in accordance with the percentages that the widths of the keys account for in the keyboard width, the width W2 exceeding the touchable range of the thumbs of both hands in the physical keyboard width is added to the widths of the keys arranged on the middle line x, and half of the width W2 is added to the widths of the left side key and the right side key on both sides of the middle line x respectively, so that all the keys in the physical keyboard are respectively located at positions which can be touched by the thumbs of the left and right hands of the operator. In other words, as shown in FIG. 7, the width of the middle key counteracts the width W2 exceeding the touchable range of the thumbs of both hands in the physical keyboard width, or the widths of the left side key and the right side key closest to the middle line x of the physical keyboard counteract the width W2 exceeding the touchable range of the thumbs of both hands in the physical keyboard width, so that all the keys in the physical keyboard are respectively located at positions which can be touched by the thumbs of the left and right hands of the operator.

In order to solve the technical problem that as the width of the keyboard is large, the thumbs of the left and right hands of the operator cannot touch part of the keys at the middle of the keyboard, the following technical solution can also be adopted, as shown in FIG. 7:

when the physical keyboard is manufactured, the width of the key arranged on the middle line x of the physical keyboard is set at first, at least the leftmost end of the key on the middle line x is touched by the thumb of the left hand and at least the rightmost end of the key on the middle line x is touched by the thumb of the right hand, and then the widths of other keys on both sides of the key on the middle line x are set; the widths of the left side key and the right side key closest to the middle line are set at first, so that at least the leftmost end of the left side key can be touched by the thumb of the left hand and at least the rightmost end of the right side key can be touched by the thumb of the right hand; and then the widths of other keys excluding the left side key and the right side key are set. Therefore, all the keys in the physical keyboard are respectively located at positions which can be touched by the thumbs of the left and right hands of the operator. In other words, the width of the key on the middle line x counteracts the width W2 exceeding the touchable range of the thumbs of both hands in the physical keyboard width, and the widths of the left side key and the right side key closest to the middle line x of the physical keyboard counteract the width W2 exceeding the touchable range of the thumbs of both hands in the physical keyboard width, so that all the keys in the physical keyboard are respectively located at positions which can be touched by the thumbs of the left and right hands of the operator.

Further, the distance from a left end side line of a middle key arranged on the middle line of the physical keyboard to the middle line is equal to the distance from a right end side line of the middle key to the middle line; and the distance from the left end side line of the left side key, which is arranged on the left side of the middle line of the keyboard and is closest to the left side of the middle line, to the middle line is equal to the distance from the right end side line of the right side key, which is arranged on the right side of the middle line and is closest to the right side of the middle line in the same row of keys, to the middle line.

Further, the increased width value of one middle key arranged on the middle line of the keyboard is twice as large as the respective increased width value of the left side key and the right side key being closest to the middle line of the keyboard.

In one aspect of the present invention, a keyboard having a dimension such that when an operator holds a left side and a right side of the keyboard with a left hand and a right hand respectively, a middle region of the keyboard is untouchable by a left thumb and a right thumb of the operator, the keyboard comprising:

at least three rows of keys, each row having more than five keys, wherein each row of keys comprises one or two keys selected from the group consisting of a middle key lying on a middle line perpendicular to the rows of keys and having a width greater than a width of the middle region disposed beyond touchable ranges of the left and right thumbs of the operator; and left and right middle keys lying on a left side and a right side of the middle line and adjacent to each other, each of the left middle key and the right middle key having a width greater than a half of the width of the middle region;

wherein all the keys in the keyboard are respectively located at positions touchable by the left and right thumbs of the operator;

wherein preset widths of the keys in the keyboard are set according to a keyboard width and percentages that widths of the keys account for in the keyboard width, a remaining width acquired by subtracting the width of the middle region from the keyboard width is used as the keyboard width when setting the widths of the keys, wherein the width of the middle key has the width of the middle region added therein, and the width of each of the left middle key and the right middle key has a half of the width of the middle region added therein;

wherein when the operator holds the keyboard with both hands, the left and right thumbs of the operator at least respectively touch a leftmost end and a rightmost end of the middle key, and the left and right thumbs of the operator at least respectively touch a leftmost end of the left middle key and a rightmost end of the right middle key; and wherein the keyboard is a physical keyboard, and the middle region of the physical keyboard is untouchable by the left and right thumbs of the operator holding the left and right sides of the keyboard with the left and right hands respectively.

In one aspect of the present invention, the physical keyboard can be physically separated into a left portion and a right portion along the middle line of the physical keyboard. The left and right portions may be physically engaged by known methods such as hinged-connection, snap-connection, etc.

The above contents are further detailed description of the present invention in combination with the specific embodiments. However, it cannot be held that the specific embodiments of the present invention are only limited to the description. Those of ordinary skill in the art to which the present invention pertains can still make a variety of simple modifications or substitutions on the premise of not deviating from the conception of the present invention, and these modification or substitutions should be deemed to be within the scope of patent protection determined by the proposed claims of the present invention.

What is claimed is:

1. A keyboard sized and shaped for operation by a left thumb and a right thumb of an operator holding a left side and a right side of the keyboard with a left hand and a right hand respectively, the keyboard comprising:

a middle region untouchable by the left and right thumbs of the operator holding the left and right sides of the keyboard with the left and right hands respectively, the middle region being variable in dimension according to a touchable range of the left and right thumbs of the operator;

at least three rows of keys, each row having more than five keys, wherein each row of keys comprises one or two keys selected from the group consisting of a middle key lying on a middle line perpendicular to the rows of keys and having a width greater than a width of the middle region; and left and right middle keys lying on a left side and a right side of the middle line and adjacent to each other, each of the left middle key and the right middle key having a width greater than a half of the width of the middle region;

wherein all the keys in the keyboard are respectively located at positions touchable by the left and right thumbs of the operator;

wherein preset widths of the keys in the keyboard are set according to a keyboard width and percentages that widths of the keys account for in the keyboard width, a remaining width acquired by subtracting the width of the middle region from the keyboard width is used as the keyboard width when setting the widths of the keys, wherein the width of the middle key has the width of the middle region added therein, and the width of each of the left middle key and the right middle key has a half of the width of the middle region added therein;

wherein when the operator holds the keyboard with both hands, the left and right thumbs of the operator at least respectively touch a leftmost end and a rightmost end of the middle key, and the left and right thumbs of the operator at least respectively touch a leftmost end of the left middle key and a rightmost end of the right middle key; and wherein the keyboard is a physical keyboard.

2. A keyboard sized and shaped for operation by a left thumb and a right thumb of an operator holding a left side and a right side of the keyboard with a left hand and a right hand respectively, the keyboard comprising:

a middle region untouchable by the left and right thumbs of the operator holding the left and right sides of the keyboard with the left and right hands respectively, the middle region being variable in dimension according to a touchable range of the left and right thumbs of the operator;

at least three rows of keys, each row having more than five keys, wherein each row of keys comprises one or two keys selected from the group consisting of a middle key lying on a middle line perpendicular to the rows of keys and having a width greater than a width of the middle region; and left and right middle keys lying on a left side and a right side of the middle line and adjacent to each other, each of the left middle key and the right middle key having a width greater than a half of the width of the middle region;

wherein all the keys in the keyboard are respectively located at positions touchable by the left and right thumbs of the operator;

wherein a distance from a left sidewall of the middle key to the middle line is equal to a distance from a right sidewall of the middle key to the middle line; and a distance from a left sidewall of the left middle key to the middle line is equal to a distance from a right sidewall of the right middle key to the middle line; and wherein preset widths of the keys in the keyboard are set according to a keyboard width and percentages that widths of the keys account for in the keyboard width, a remaining width acquired by subtracting the width of the middle region from the keyboard width is used as the keyboard width when setting the widths of the keys, wherein the width of the middle key has the width of the middle region added therein, and the width of each of the left middle key and the right middle key has a half of the width of the middle region added therein.

3. The keyboard of claim 2, wherein the keyboard further comprises blank areas, and the preset widths of the keys and preset widths of the blank areas are set according to the keyboard width and the percentages that the widths of the keys and the widths of the blank areas account for in the keyboard width.

4. The keyboard of claim 2, wherein when the operator holds the keyboard with both hands, the left and right thumbs of the operator at least respectively touch a leftmost end and a rightmost end of the middle key, and the left and right thumbs of the operator at least respectively touch a leftmost end of the left middle key and a rightmost end of the right middle key.

5. The keyboard of claim 2, wherein the keyboard is a physical keyboard.

6. The keyboard of claim 2, wherein the keyboard is a virtual keyboard, and the virtual keyboard is displayed on a wide touch screen.

7. The keyboard of claim 6, wherein the operator modifies a specific parameter to locate all the keys in a current virtual keyboard at touchable positions of the thumbs of the left and right hands respectively, and the specific parameter is a parameter value used for determining the width of the middle region.

8. A key layout method for a keyboard sized and shaped for operation by a left thumb and a right thumb of an operator holding a left side and a right side of the keyboard with a left hand and a right hand respectively, the method comprising the steps of:

presetting a keyboard, wherein the keyboard is provided with a middle region untouchable by the left and right thumbs of the operator holding the left and right sides of the keyboard with the left and right hands respectively, the middle region being variable in dimension according to a touchable range of the left and right thumbs of the operator; and at least three rows of keys, each row having more than five keys; and counteracting a width of the middle region by a width of a middle key lying on a middle line perpendicular to the rows of keys, and widths of a left middle key and an adjacent right middle key lying on a left side and a right side of the middle line, so that all the keys in the keyboard are respectively located at positions touchable by the left and right thumbs of the operator;

wherein a distance from a left sidewall of the middle key to the middle line is equal to a distance from a right sidewall of the middle key to the middle line; and a distance from a left sidewall of the left middle key to the middle line is equal to a distance from a right sidewall of the right middle key to the middle line; and wherein preset widths of the keys in the keyboard are set according to a keyboard width and percentages that widths of the keys account for in the keyboard width, a remaining width acquired by subtracting the width of the middle region from the keyboard width is used as the keyboard width when setting the widths of the keys, wherein the width of the middle key has the width of the middle region added therein, and the width of each of the left middle key and the right middle key has a half of the width of the middle region added therein.

9. The key layout method of claim 8, wherein the keyboard further comprises blank areas, and the preset widths of the keys and preset widths of the blank areas are set according to the keyboard width and the percentages that the widths of the keys and the widths of the blank areas account for in the keyboard width.

10. The key layout method of 8, wherein the keyboard is a physical keyboard.

11. The key layout method of claim 9, wherein the keyboard is a virtual keyboard, and the virtual keyboard is displayed on a wide touch screen.

12. The key layout method of claim 11, wherein the operator modifies a specific parameter to locate all the keys in a current virtual keyboard at touchable positions of the thumbs of the left and right hands respectively, and the specific parameter is a parameter value used for determining the width of the middle region.

13. The key layout method of claim 11, wherein key layout of the virtual keyboard comprises:

displaying a preset virtual keyboard on the touch screen according to a conventional key layout and corresponding settings of the preset virtual keyboard;

determining a width of the preset virtual keyboard on a current screen according to a width of the current screen; and calculating preset widths of the keys in the current virtual keyboard and preset width of blank areas according to the current virtual keyboard width and percentages that the preset widths of the keys and the preset width of the blank areas account for in the virtual keyboard width.

* * * * *